Aug. 18, 1964  R. J. MELTZER  3,145,249
ENDOSCOPE WINDOW
Filed Jan. 2, 1962

INVENTOR.
ROBERT J. MELTZER
BY
ATTORNEYS

3,145,249
ENDOSCOPE WINDOW
Robert J. Meltzer, Irondequoit, N.Y., assignor to Bausch & Lomb Incorporated, Rochester, N.Y., a corporation of New York
Filed Jan. 2, 1962, Ser. No. 163,459
3 Claims. (Cl. 88—1)

This invention relates to an endoscope and more particularly to a cleanable window for use in an endoscope.

In the process of visual observation through an endoscope, foreign material often collects on the window of the endoscope and obscures the vision of the operator. It is difficult to remove the foreign material without removal of the instrument from the body. This not only is inconvenient but causes much delay in performing an examination.

Accordingly, this invention is intended to overcome this problem in providing a cleanable window in an endoscope thereby maintaining the greatest efficiency for visual observation.

It is an object of this invention to provide a cleanable window in an endoscope.

It is another object of this invention to provide a wiper element engaging a window element with relative motion between the two elements thereby cleaning the window element.

It is a further object of this invention to provide a spherical window element and an engaging wiper element with means for rotating the spherical element thereby cleaning the spherical window for maximum efficiency of light transmission.

The objects of this invention are accomplished by using a spherical element to operate as a window in optical alignment with the optical system in an endoscope. A compensating lens element is positioned intermediate the spherical window and the optical system to compensate for the power of the spherical element in transmitting the image to the optical system. A means is also provided which rotates the spherical window element relative to a wiper element thereby removing any foreign material from the window to provide maximum light transmission through the window. The means for providing relative motion between the window and the wiper may be any suitable mechanism for rotating the spherical element.

The following figures illustrate the preferred version of the window cleaning means. Various modifications of this device may be devised which may fall within the spirit of the invention of which the preferred version is illustrated in the following figures.

Figure 1:
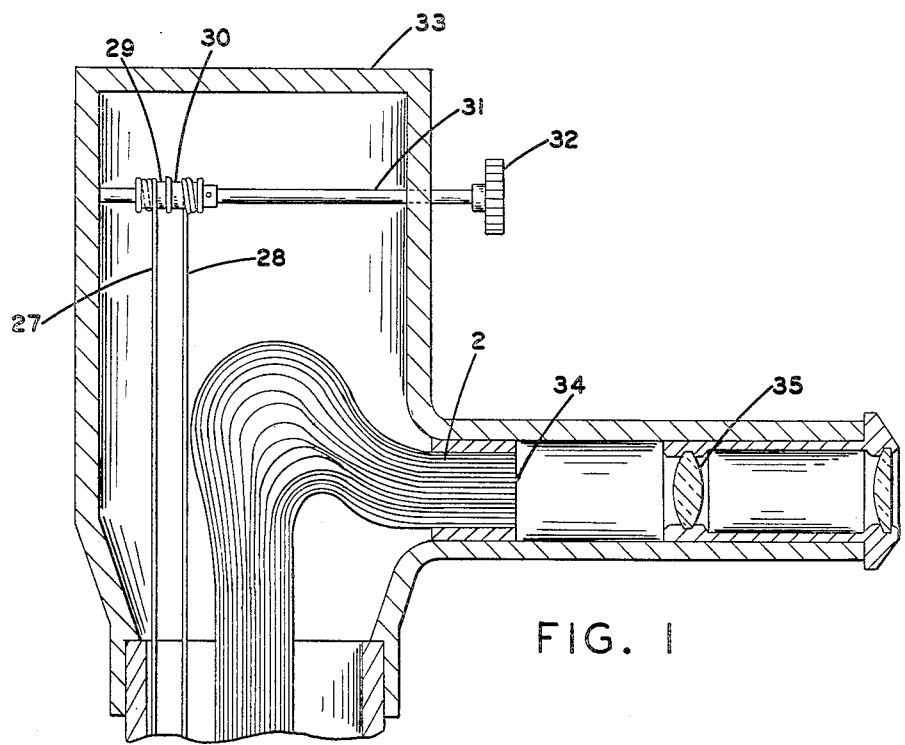
FIG. 1 is a cross section view of the endoscope.

Referring to FIG. 1 the endoscope is shown in a cross section view. A bundle of image transmitting fibers 2 extend longitudinally through the center portion of the endoscope and form an image receiving surface 3. The bundle of fibers is mounted in the plate 4 fixed within the housing 5 of the endoscope. A lens 6 is centrally supported in the endoscope 1 by the lens mount 7.

The housing 5 extends forwardly to receive the concave lens 8 which is axially aligned with the sperical window 9. The concave lens 8 compensates for the power of the window element 9.

The spherical window 9 is retained within the sleeve 10 which is made of a plastic material sold under the trademark Teflon. This sleeve is formed with a spherical seat 11 which forms a wiper means by the edge 12 engaging with the spherical window 9. The Teflon sleeve 10 threadedly engages the outer periphery of the housing 5.

The forward end of the housing 5 engages an O-ring 14 which is compressed between the housing 5 and the washer 15. The resiliency of the O-ring maintains a firm seating between the washer 15 and the spherical window 9. The washer 15 is preferably constructed of a plastic material which is sold under the trademark Teflon, to provide the resiliency for the seating surface 16 engaging the window 9.

Figure 2:
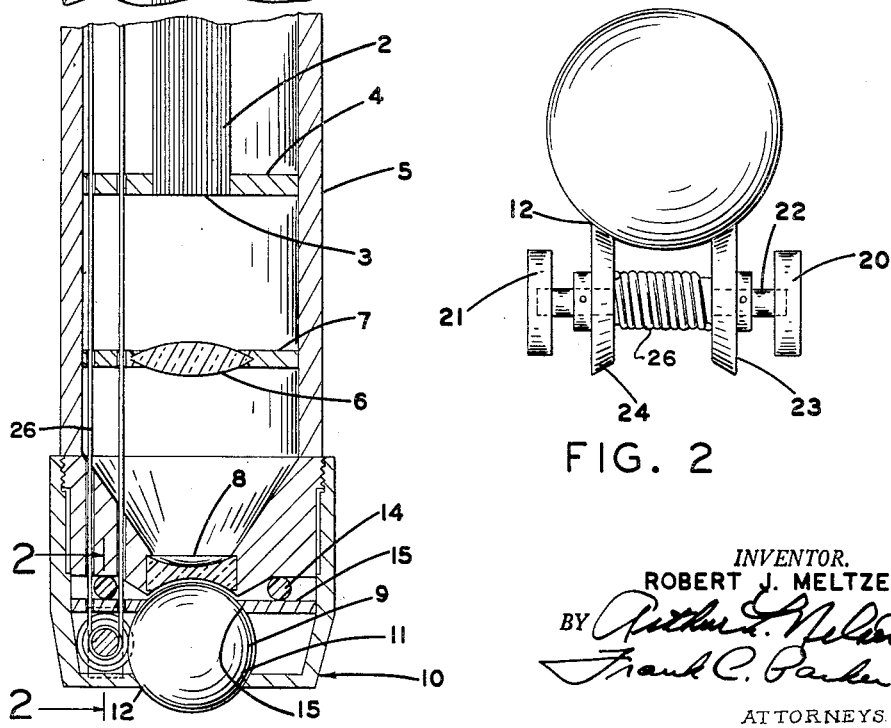
FIG. 2 is an enlarged cross section view taken on line 2—2 of FIG. 1.

FIG. 2 illustrates an enlarged cross section view of the means for rotating the window 9. The bearings 20 and 21 support the ends of the shaft 22. The bearings 20 and 21 are fixed between the washer 15 and the sleeve 10 maintaining a constant distance to provide the supporting means for the shaft 22.

The shaft 22 is fixed to the beveled friction gears 23 and 24. The beveled surface on the friction gears 23 and 24 frictionally engages the spherical element 9 and rotates the element as the friction gears are rotated. The intermediate portion of the shaft 22 forms a cylindrical surface for winding a cord-like belt 26. As the tension on the belt is unequalized the belt rotates the shaft 22 and friction gears 23 and 24. The rotation of the friction gears 23 and 24 in turn rotate the spherical element 9.

Referring to FIG. 1 the ends 27 and 28 of the belt 26 are wound on the pulleys 29 and 30 respectively. The pulleys 29 and 30 are fixed to the shaft 31. The knob 32 is also fixed on the shaft 31 and provides a means for rotating the shaft 31 and the pulleys 29 and 30. The casing 33 provides the support for the control mechanism which comprises the knob and shaft and pulleys.

The bundle of fibers 2 provide an image forming surface 34. The image formed on the surface 34 is transmitted through the lens element 35 to a point of visual observation.

The operation of the device as described above will be set forth in the following paragraphs. The cleanable window mechanism provides a means for maintaining the window clean for maximum light transmission through the window element 9. As foreign material collects on the window 9, it can be readily removed.

As the knob 32 is rotated a tension is created on one end 27 or 28 of the belt depending upon direction of the rotation of the knob. With tension on the one end, slack is created on the opposite end thereby causing a winding on the tension end of the cord and an unwinding on the slack end of the cord. The winding and unwiding of the ends of the cords 27 and 28 on the pulleys 29 and 30 respectively causes a rotation of the shaft 22. The shaft 22 forms a cylindrical surface receiving the belt 26 and rotates the shaft 22 in response to the tension and slack applied on the ends of the belt. The direction of rotation being in response to the direction of the rotation on the knurled knob 32.

As the shaft 22 is rotated the belt operates to rotate the friction gears 23 and 24. The surfaces of the friction gears 23 and 24 engaging the spherical window 9 causes a rotation of the window. As the sphere 9 is rotated the edge 12 of the sleeve 10 wipes the foreign material from the window thereby providing a clean surface for visual observation.

A spherical window in effect operates as a lens having a high power. It is desirable to compensate for the power of the window so the concave lens 8 is placed immediately behind the window.

The optical system operates in a conventional manner between the lens 6 and the point of visual observation externally of the window.

The endoscope as illustrated and described is a preferred embodiment of this invention and is claimed in the attached claims.

What is claimed is:

1. An endoscope including a wiper device comprising, an elongated endoscope housing, a spherical window rotatably mounted in one end portion of said endoscope housing, an optical system optically aligned with said window for forming an image in combination with said window, a wiper supported on said endoscope housing engaging said window, a rotatable member supported in said housing and frictionally engaging said window, means accessible from the opposite end portion of said endoscope housing providing rotation of said member and thereby providing relative motion between said window and said wiper for removing foreign material from the external surface of said window.

2. The endoscope including a wiper device as defined in claim 1 wherein said optical system includes a negative lens for flattening the image field.

3. The endoscope including a wiper device as defined in claim 1 wherein said rotatable member includes a pair of friction gears axially spaced on their axis of rotation.

References Cited in the file of this patent

UNITED STATES PATENTS

| | | |
|---|---|---|
| 1,196,081 | Carence | Aug. 29, 1916 |
| 2,160,099 | Zeligman | May 30, 1939 |
| 2,402,216 | Vennigerholz | June 18, 1946 |
| 2,927,574 | Scholz | Mar. 8, 1960 |
| 2,975,785 | Sheldon | Mar. 21, 1961 |
| 3,071,161 | Ulrich | Jan. 1, 1963 |

FOREIGN PATENTS

| | | |
|---|---|---|
| 677,704 | Great Britain | Aug. 20, 1952 |

OTHER REFERENCES

Offner et al.: An $f:10$ Camera for Astronomical Spectroscopy, Journal of the Optical Society of America, vol. 41, No. 3, March 1951, pages 169–172.